United States Patent [19]

Okazaki et al.

[11] Patent Number: 5,341,393
[45] Date of Patent: Aug. 23, 1994

[54] LASER-DIODE-PUMPED SOLID-STATE LASER

[75] Inventors: Yoji Okazaki; Hiroaki Hyuga, both of Kanagawa, Japan

[73] Assignee: Fuji Photo Film Co., Ltd., Kanagawa, Japan

[21] Appl. No.: 29,378

[22] Filed: Mar. 10, 1993

Related U.S. Application Data

[63] Continuation of Ser. No. 697,568, May 9, 1991.

[30] Foreign Application Priority Data

| May 10, 1990 | [JP] | Japan | 2-120350 |
| Jun. 25, 1990 | [JP] | Japan | 2-165890 |
| Jun. 25, 1990 | [JP] | Japan | 2-165891 |

[51] Int. Cl.5 .................................................. H01S 3/09
[52] U.S. Cl. .......................................... 372/69; 372/21; 372/22; 372/70; 372/75; 359/326; 359/327; 359/328
[58] Field of Search .............. 372/21, 22, 70, 75, 372/69; 307/425-427

[56] References Cited

U.S. PATENT DOCUMENTS

| 4,710,940 | 12/1987 | Sipes, Jr. | 372/75 |
| 4,731,787 | 3/1988 | Fan et al. | 372/22 |
| 4,739,507 | 4/1988 | Byer et al. | 372/22 |
| 4,791,631 | 12/1988 | Baumert et al. | 372/22 |
| 4,797,893 | 1/1989 | Dixon | 372/66 |
| 4,870,723 | 11/1989 | Dixon et al. | 372/21 |
| 4,910,740 | 3/1990 | Oka | 372/22 |
| 5,031,182 | 7/1991 | Anthon et al. | 372/22 |
| 5,124,999 | 6/1992 | Okazaki et al. | 372/21 |
| 5,175,741 | 12/1992 | Okazaki | 372/69 |

FOREIGN PATENT DOCUMENTS 62-210432  9/1987  Japan.

*Primary Examiner*—Georgia Y. Epps
*Attorney, Agent, or Firm*—Sughrue, Mion, Zinn, Macpeak & Seas

[57] ABSTRACT

A laser-diode-pumped solid-state laser includes a solid-state laser rod which is doped with a rare-earth material such as neodium and has a wavelength converting function and a semiconductor laser which pumps the solid-state laser rod. Opposite end faces of the solid-state laser rod are formed into resonator mirrors, and a wavelength-converted wave such as a second harmonic of the laser beam oscillated by the solid-state laser rod or a sum frequency wave of a laser beam oscillated by the solid-state laser rod and a semiconductor laser beam emitted by a semiconductor laser is extracted.

8 Claims, 6 Drawing Sheets

F I G.4
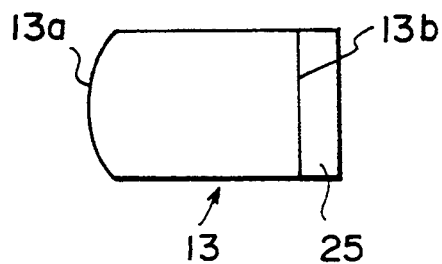
F I G.5
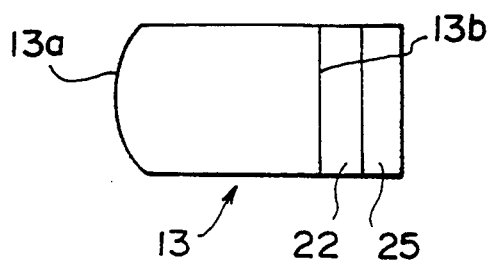
F I G.6
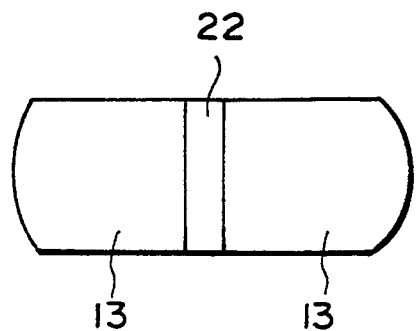
F I G.7
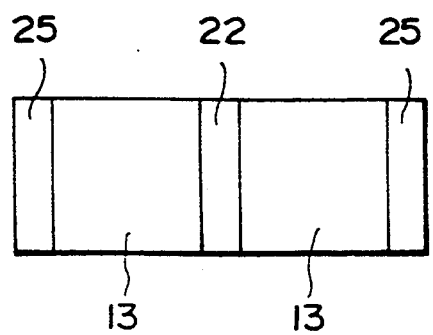
F I G.8
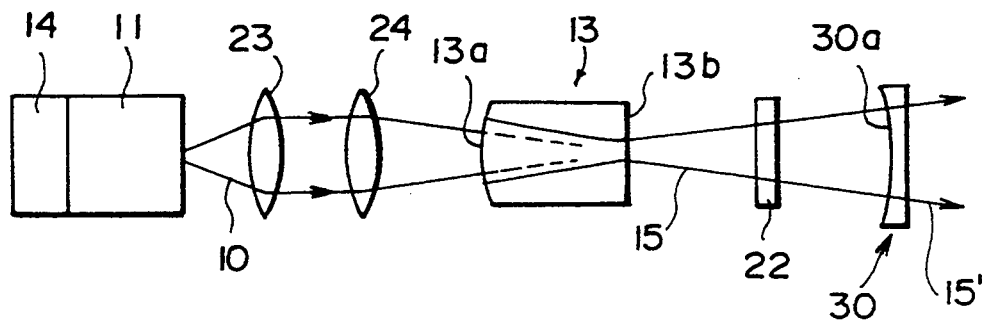

LASER-DIODE-PUMPED SOLID-STATE LASER

This is a continuation of application Ser. No. 07/697,568 filed May 9, 1991.

BACKGROUND OF THE INVENTION

1. Field of the Invention

This invention relates to a laser-diode-pumped solid-state laser comprising a solid-state laser rod pumped by a semiconductor laser (laser diode), and more particularly to a laser-diode-pumped solid-state laser in which the solid-state laser rod per se functions as an optical wavelength converter for converting a laser beam which is oscillated by the solid-state laser rod into a second harmonic or converting a laser beam which is oscillated by the solid-state laser rod and another laser beam into a wavelength-converted wave such as a sum frequency wave of the laser beams.

2. Description of the Prior Art

As disclosed, for instance, in *SPIE*, Vol. 1104, page 100, March 1989, there have been known Nd:COANP, Nd:PNP and the like as solid-state laser rods which are doped with a rare-earth element such as Nd (neodium) and have an optical wavelength-converting function. As such solid-state laser rods, Nd:LiNbO$_3$, NYAB (Nd$_x$Y$_{1-x}$Al$_3$(BO$_3$)$_4$ wherein x stands for 0.04 to 0.08) and the like are further known as disclosed in the same magazine, page 132, and these rods are referred to as "Self-Frequency-Doubling Crystal".

As the laser-diode-pumped solid-state laser in which such a solid-state laser rod is employed, there have been known those in which a NYAB crystal is employed as the solid-state laser rod and a second harmonic of the laser beam which is oscillated by the solid-state laser rod is extracted, as disclosed in *SPIE*, Vol. 1104, page 132, March, 1989 or *LASER KENKYU*, Vol. 17, No. 12, page, 48 (1989). Further, in *J. Opt. Soc. Am* Vol. 3, page 140 (1986), it is suggested to excite Nd:MgO:LiNbO$_3$ by a dye laser having a wavelength of 0.60 μm and to obtain a second harmonic of the laser beam oscillated by the solid-state laser rod.

Further, as disclosed, for instance, in *SPIE*, Vol. 1104, page 13, March, 1989, it is suggested to provide a single crystal of KTP which converts the wavelength of a laser beam oscillated by a solid-state laser in a Nd-doped YAG solid-state laser rod and a resonator, thereby obtaining a sum frequency wave of the laser beam oscillated by the solid-state laser and the pumping laser beam.

However, in conventional solid-state lasers having such a wavelength converting function, optical elements such as a nonlinear optical crystal, a solid-state laser rod, an output mirror, and an etalon or wave plate which converts the laser beam oscillated by the solid-state laser rod into a single-longitudinal-mode laser beam to stabilize the power of the wavelength-converted wave are discretely disposed and are discretely processed, lapped and coated. Accordingly, the laser beam oscillated by the solid-state laser rod is scattered at the processed surfaces and the coatings, reflected at the coatings and absorbed by the coatings, which together with the absorption in the parts results in an internal loss in the resonator as large as not less than several percents. The internal loss increases as the number of the parts increases. The internal loss reduces the power of the oscillated laser beam in the resonator and lowers wavelength conversion efficiency.

Due to the large internal loss, a high-output-power array laser is conventionally employed as the pumping light source in order to compensate for the large internal loss in the resonator and increase the power of the oscillated laser beam in the resonator, thereby improving the wavelength conversion efficiency. However, since the spectral line width of the conventional array laser is as large as several nanometers, the efficiency at which the laser beam is oscillated by the solid-state laser is low and the energy utilization efficiency is low.

Especially, since the etalon and the wave plate which are provided in the resonator in order to stabilize the power of the wavelength-converted wave much increase the internal loss, conventionally, a high-output-power array laser or broad area laser must be employed. On the other hand, when the etalon and the wave plate are eliminated, there arises a problem that the power of the wavelength-converted wave becomes unstable due to confliction between the longitudinal modes of the laser beam oscillated by the nonlinear optical element when the second harmonic of the oscillated laser beam is to be extracted.

SUMMARY OF THE INVENTION

In view of the foregoing observations and description, the primary object of the present invention is to provide a laser-diode-pumped solid-state laser in which the wavelength conversion efficiency is high, the energy utilization efficiency is high and the power of the wavelength-converted wave is stable.

In accordance with a first aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that opposite end faces of the solid-state laser rod are formed into resonator mirrors, and a wavelength-converted wave such as a second harmonic of the laser beam oscillated by the solid-state laser rod or a sum frequency wave of a laser beam oscillated by the solid-state laser rod and a semiconductor laser beam emitted by a semiconductor laser is extracted.

In accordance with a second aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that an optical element such as an etalon or a wave plate which stabilizes the power of a wavelength-converted wave is integrally provided on one end face of the solid-state laser rod, the other end face of the solid-state laser rod is formed into a resonator mirror and one end face of the optical element is formed into the other resonator mirror, thereby forming a resonator and a wavelength-converted wave such as a second harmonic of the laser beam oscillated by the solid-state laser rod or a sum frequency wave of a laser beam oscillated by the solid-state laser rod and a semiconductor laser beam emitted by a semiconductor laser is extracted.

In accordance with a third aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that an optical element such as an etalon or a wave plate which stabilizes the power of a wavelength-converted wave is integrally sandwiched between one end faces of a pair of solid-state laser rods, the other end faces of the solid-state laser rods are formed into resonator mirrors, and a wavelength-converted wave such as a second harmonic of the laser beam oscillated by the solid-state laser rod or a sum frequency wave of a laser beam oscillated by the solid-state laser rod and a semiconductor laser beam emitted by a semiconductor laser is extracted.

In accordance with a fourth aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that a plurality of optical elements such as an etalon or a wave plate which stabilizes the power of a wavelength-converted wave are bonded on one or more solid-state laser rod(s), at least one end face of the optical elements is formed into a resonator mirror to form a resonator, and a wavelength-converted wave such as a second harmonic of the laser beam oscillated by the solid-state laser rod or a sum frequency wave of a laser beam oscillated by the solid-state laser rod and a semiconductor laser beam emitted by a semiconductor laser is extracted.

In accordance with a fifth aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that opposite end faces of the solid-state laser rod are formed into resonator mirrors for a laser beam oscillated by the solid-state laser rod and a wavelength-converted wave such as a second harmonic of a laser beam oscillated by the solid-state laser rod or a sum frequency wave of a laser beam oscillated by the solid-state laser rod and a semiconductor laser beam emitted by a semiconductor laser, thereby forming a resonator, and a resonating wavelength-converted wave is extracted.

In accordance with a sixth aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that an optical element such as an etalon or a wave plate which stabilizes the power of a wavelength-converted wave is integrally provided on one end face of the solid-state laser rod, the other end face of the solid-state laser rod and one end face of the optical element are formed into resonator mirrors for a laser beam oscillated by the solid-state laser rod and a wavelength-converted wave such as a second harmonic of a laser beam oscillated by the solid-state laser rod or a sum frequency wave of a laser beam oscillated by the solid-state laser rod and a semiconductor laser beam emitted by a semiconductor laser, thereby forming a resonator, and a resonating wavelength-converted wave is extracted.

In accordance with a seventh aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that an optical element such as an etalon or a wave plate which stabilizes the power of a wavelength-converted wave is integrally sandwiched between one end faces of a pair of solid-state laser rods, the other end faces of the solid-state laser rods are formed into resonator mirrors for a laser beam oscillated by the solid-state laser rod and a wavelength-converted wave such as a second harmonic of a laser beam oscillated by the solid-state laser rod or a sum frequency wave of a laser beam oscillated by the solid-state laser rod and a semiconductor laser beam emitted by a semiconductor laser, thereby forming a resonator, and a resonating wavelength-converted wave is extracted.

In accordance with an eighth aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that a plurality of optical elements such as an etalon or a wave plate which stabilizes the power of a wavelength-converted wave are bonded on one or more solid-state laser rod(s), at least one end face of the optical elements is formed into a resonator mirror to form a resonator for a laser beam oscillated by the solid-state laser rod and a wavelength-converted wave such as a second harmonic of a laser beam oscillated by the solid-state laser rod or a sum frequency wave of a laser beam oscillated by the solid-state laser rod and a semiconductor laser beam emitted by a semiconductor laser, thereby forming a resonator, and a resonating wavelength-converted wave is extracted.

In accordance with a ninth aspect of the present invention, there is provided a laser-diode-pumped solid-state laser comprising a solid-state laser rod which is doped with a rare-earth material such as neodium and has a wavelength converting function and a semiconductor laser which pumps the solid-state laser rod wherein the improvement comprises that said solid-state laser rod is provided with a ring resonator structure and a wavelength-converted wave such as a second harmonic of the laser beam oscillated by the solid-state laser rod or a sum frequency wave of a laser beam oscillated by the solid-state laser rod and a semiconductor laser beam emitted by a semiconductor laser is extracted.

As the solid-state laser rod, materials which are usually called "Self-Frequency-Doubling Crystal" such as NYAB, Nd:MgO:LiNbO$_3$, Nd:PNP and the like can be used. Further, wavelength conversion nonlinear optical materials obtained by doping inorganic materials such as KTP, β-BBC, $LiB_2O_3$, $KNbO_3$ and kalkopyrito semiconductors with a rare-earth material such as neodium can also be used. Among those, the KTP is preferable in that it has a large nonlinear optical constant, a wide acceptable temperature range and a wide acceptable angular range, and accordingly it can provide a high wavelength conversion efficiency.

Further, those obtained by doping an organic nonlinear optical material such as NPP(N-(4-nitrophenyl)-L-prolinol), NPAN(N-(4-nitrophenyl)-N-methylaminoacetonitrile), PRA (3,5-dimethyl-1-(4-nitrophenyl) pyrazole disclosed in Japanese Unexamined Patent Publication No. 62(1987)-210432, or the like with a rare-earth material as represented by Nd:PNP can also be used. Especially the PRA has a nonlinear optical constant larger than said KTP and has a wide acceptable temperature range, and accordingly it can provide a higher wavelength conversion efficiency.

When a resonator is formed by forming opposite end faces of the solid-state laser rod into resonator mirrors, the number of parts is reduced, the number of lapped surfaces is reduced to two, the number of coated surfaces is reduced to two, and the number of laser beam absorbing medium is reduced to one, whereby the internal loss is greatly reduced. As a result, the internal power of the laser beam oscillated by the solid-state laser rod increases and the wavelength conversion efficiency is greatly improved. Further since the length of the resonator is reduced to several millimeters, the number of the longitudinal modes is reduced up to one, and longitudinal mode confliction by way of a nonlinear optical crystal is suppressed, whereby the power of the wavelength-converted wave can be stabilized.

Also in the case where an optical element or optical elements are integrally bonded to the solid-state laser rod in order to surely stabilize the power of the wavelength-converted wave, the internal loss of the oscillated laser beam is reduced since the input mirror and the output mirror can be omitted and the part of internal loss which is due to absorption, scatter and reflection by the input and output mirrors becomes null. As a result, the internal power of the laser beam oscillated by the solid-state laser rod increases and the wavelength conversion efficiency is greatly improved. Of course, power of the wavelength-converted wave can be stabilized, Conventionally, the efficiency of obtaining a sum frequency wave of the semiconductor laser beam and the laser beam oscillated by the solid-state laser is lower than that of obtaining a second harmonic and is too low to be practical. In accordance with the present invention, since the internal loss of the laser beam oscillated by the solid-state laser rod is reduced and the internal power increases, the sum frequency wave can be obtained at a high efficiency.

Especially, in the laser-diode-pumped solid-state lasers in accordance with fifth to eighth aspects of the present invention, also the wavelength-converted wave is caused to resonate in the resonator. Accordingly, a wavelength-converted wave having an extremely high output power can be obtained.

A concept of causing the fundamental wave and the wavelength-converted wave to resonate respectively is disclosed, for instance, in *IEEE, J.Q.E* vol. QE-2, No. 6 (1966). However, in accordance with the known concept, the fundamental wave is input into a nonlinear optical material from outside and the wavelength-converted wave is caused to resonate by opposite end faces of the nonlinear optical material or a separate resonator. In such a case, a phase mismatch occurs between the fundamental wave and the wavelength-converted wave, and accordingly, it has been impossible to extract an intense wavelength-converted wave.

In accordance with the present invention, generation of the fundamental wave and wavelength conversion are both effected by a Self-Frequency-Doubling Crystal. Accordingly, the doubling loss of one of the longitudinal modes of the laser beam oscillated by the solid-state laser, which is the fundamental wave, increases, and as a result, the gain of the fundamental wave quickly increases, and the longitudinal mode of the fundamental wave readily oscillates. Accordingly, the phase matching condition is constantly satisfied and at the same time, the number of the longitudinal modes is constantly limited to one, whereby phases of the fundamental wave and the wavelength-converted wave can be constantly matched with each other. Thus, both the fundamental wave and the wavelength-converted wave can resonate.

In accordance with the ninth aspect of the present invention, the resonator is in the form of a ring resonator. Accordingly, generation of a standing wave is suppressed and the laser beam is readily oscillated in single-longitudinal-mode, whereby confliction between the longitudinal modes of the laser beam can be avoided and the power of the wavelength-converted wave can be stabilized.

In accordance with the present invention, preferably, a single-longitudinal-mode single-transverse-mode laser is used as the semiconductor laser for pumping the solid-state laser rod. Since, in accordance with the present invention, the internal loss can be greatly reduced as described above, a sufficient wavelength conversion efficiency can be obtained even if the solid-state laser rod is pumped with a small power by such a semiconductor laser. Since the laser beam emitted by such a single-longitudinal-mode single-transverse-mode laser has a spectral line width which is narrower than the broad area laser or array laser and is not larger than 0.1 nm, the laser beam is sufficiently absorbed by the solid-state laser rod and increases the oscillation efficiency of the solid-state laser rod, whereby the energy utilization efficiency can be improved. Further, since light can be condensed up to the diffraction limit unlike the case where an array laser is employed, modes of the pumping beam and the oscillating laser beam can be better matched, whereby the oscillation efficiency is further improved. When a sum frequency wave of the laser beam emitted by the array laser and the laser beam oscillated by the solid-state laser rod is to be extracted, the sum frequency wave cannot be sufficiently condensed since the laser beam emitted by the array laser is not a diffraction limit beam. In the case of the single-longitudinal-mode single-transverse-mode laser, a diffraction limit beam can be readily obtained and accordingly, the sum frequency wave can be sufficiently condensed.

BRIEF DESCRIPTION OF THE DRAWINGS

FIGS. 4 to 7 are schematic side views respectively showing various combinations of a solid-state laser rod(s) and an optical element(s) which can be employed in the present invention, FIG. 8 is a schematic side views showing a conventional laser-diode-pumped solid-state laser.

DESCRIPTION OF THE PREFERRED EMBODIMENTS

Figure 1:
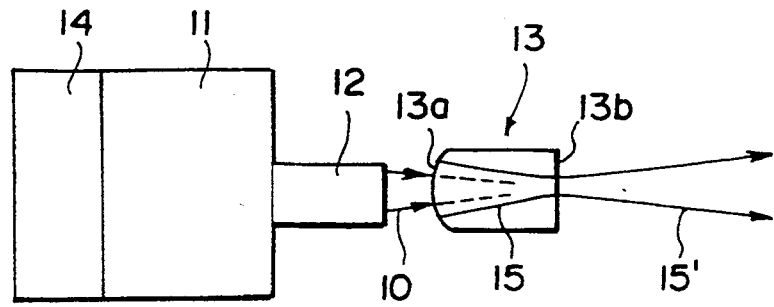
FIGS. 1 to 3 are schematic side views respectively showing laser-diode-pumped solid-state lasers in accordance with first to third embodiments of the present invention.

FIG. 1 shows a laser-diode-pumped solid-state laser in accordance with a first embodiment of the present invention. The laser-diode-pumped solid-state laser comprises a semiconductor laser 11 (a single-longitudinal-mode, single-transverse-mode laser, will be abbreviated to LD, hereinbelow) which emits a laser beam 10 as a pumping light, a Selfoc rod lens 12 which collimates the laser beam 10, which is divergent, into a beam of parallel rays and condenses the same, and a NYAB rod 13 which is a Self-Frequency-Doubling Crystal. These elements are mounted as a unitary assembly in a common casing (not shown). The LD 11 is kept at a predetermined temperature by a Peltier device 14 and a temperature control circuit (not shown).

The laser beam 10 emitted by the LD 11 has a wavelength $\lambda 1$ of 804 nm. The NYAB rod 13 emits a laser beam 15 whose wavelength $\lambda 2$ is 1,062 nm when Nd atoms with which the NYAB rod 13 is doped are excited by the laser beam 10.

The NYAB rod 13 has a crystal length L of 2 mm and a resonator is formed solely of the NYAB rod 13. That is, an end face 13a of the rod 13 facing toward the LD 11 is shaped into a spherical surface having a radius of curvature R of 2 mm and is coated with a layer which reflects the laser beam 15 (having a wavelength of 1,062 nm) with a reflectivity of not lower than 99.9% but readily transmits the pumping laser beam 10 (having a wavelength of 804 nm) with a transmissivity of not lower than 99.9%. The end face 13a forms an input side resonator mirror. The other end face 13b of the rod 13 is polished into a mirror surface and is coated with a layer which reflects a laser beam having a wavelength of 1,062 nm with a reflectivity of not lower than 99.9% but readily transmits a second harmonic 15' having a wavelength of 531 nm which will be described later. The other end face 13b forms an output side resonator mirror. Accordingly the laser beam 15 is confined between the end faces 13a and 13b and produces laser oscillation.

The laser beam 15 is converted into the second harmonic 15' having a wavelength of 531 nm (½ of the wavelength of the laser beam 15) in the NYAB rod 13 which doubles the oscillator and the wavelength converter. The NYAB rod 13 is formed by cutting the crystal so that angular phase matching of type I is achieved between the wavelengths of 1,062 nm and 531 nm. Since the output side resonator mirror 13b is coated with the layer which readily transmits a laser beam having a wavelength of 531 nm as described above, the second harmonic 15' can be extracted from the resonator at a high efficiency.

When the output power of the pumping laser beam 10 was set at 100 mW in the laser-diode-pumped solid-state laser of this embodiment, the output power of the second harmonic 15' was about 1.0 mW. Thus in this embodiment, though the crystal length L is very short (2 mm), the internal loss is reduced to not larger than 1% and the wavelength conversion efficiency can be increased.

Further since the resonator is short (2 mm in crystal length), the laser beam is readily oscillated in single-longitudinal-mode and accordingly a wavelength-converted wave which is is stable in power can be obtained.

Figure 2:
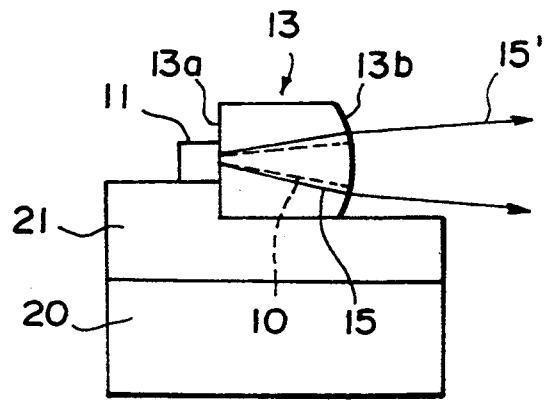

FIG. 2 shows a laser-diode-pumped solid-state laser in accordance with a second embodiment of the present invention. In FIGS. 2 to 18, the elements analogous to those shown in FIG. 1 are given the same reference numerals and will not be described again. In the embodiment shown in FIG. 2, an NYAB rod 13 which is similar to that shown in FIG. 1 in shape and opposite end faces 13a and 13b of which are coated with the same layers as the respective layers on the end faces 13a and 13b of the rod 13 shown in FIG. 1 is bonded on a copper block 21. An LD 11 is mounted on the copper block 21 in close contact with the NYAB rod 13. The copper block 21 is mounted on a Peltier device 20. With this arrangement, all the laser parts can be housed in an LD package. Further since the NYAB rod 13 is cooled by the Peltier device 20 for temperature control of the LD 11, the number of the parts can be reduced and at the same time, since longitudinal mode hop of the NYAB rod 13 can be suppressed by temperature control by the Peltier device 20, fluctuation in the output power of the second harmonic 15' with change in the ambient temperature can be suppressed substantially completely.

Figure 3:
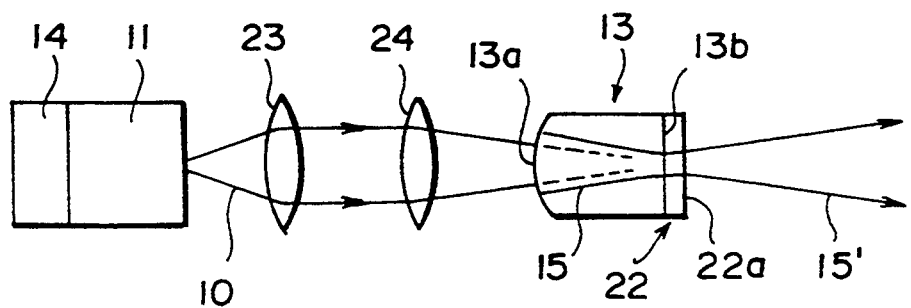

FIG. 3 shows a laser-diode-pumped solid-state laser in accordance with a third embodiment of the present invention. In this embodiment, an NYAB rod 13 which has a crystal length L of 7 mm longer than those in the first and second embodiments and has an input side end face 13a whose radius of curvature R is 7 mm is used in order to obtain a higher output power of the second harmonic 15'. Since the length of the resonator is substantially enlarged, the laser beam 15 emitted by the NYAB rod 13 oscillates in a multiple-longitudinal mode. In order to suppress oscillation of the laser beam 15 in a multiple-longitudinal mode, an etalon 22 is bonded on the output side end face 13b of the rod 13, and the output side end face 22a of the etalon 22 is coated with an antireflection layer similar to that coated on the output side end face 13b in the first embodiment.

An LD 11 which is the same as that used in the first embodiment is used as the pumping light source, and the laser beam 10 emitted by the LD 11 is input into the NYAB rod 13 through a collimator lens 23 which collimates the laser beam 10, which is divergent, into a beam of parallel rays and a condenser lens 24 which focuses collimated laser beam 10.

The oscillated laser beam 15 resonates between the input side end face 13a of the NYAB rod 13 and the output side end face 22a and produces laser oscillation. The output power of the second harmonic 15' extracted from the laser-diode-pumped solid-state laser of this embodiment was about 5 mW when the output power of the pumping laser beam 10 was set at 100 mW.

In the case of a modification of the third embodiment where the crystal length L of the NYAB rod 13 was 5 mm and the radius of curvature of the input side end face 13a was 5 mm, the output power of the second harmonic 15' was 20 mW when 400 mW broad area pumping laser beam 10 was input.

The power of the wavelength-converted wave can be stabilized also by bonding a wave plate 25 (e.g., a quarter-wave plate) on the output side end face 13b of the NYAB rod 13 instead of the etalon 22 as shown in FIG. 4, or by bonding an etalon 22 on the output side end face 13b and bonding a wave plate 25 on the etalon 22 as shown in FIG. 5. Further, the power of the wavelength-converted wave can be stabilized by sandwiching an etalon 22 between a pair of NYAB rods 13 and integrating them as shown in FIG. 6, or by sandwiching an etalon 22 between a pair of NYAB rods 13, bonding a pair of wave plates 25 on the outer end faces of the respective NYAB rods 13 and integrating them as shown in FIG. 7. In these cases, the resonator can be formed by coating opposite ends of the assembly of the NYAB rod(s) and the optical element(s) with the same layers as those used in the first embodiment.

FIG. 8 shows a conventional laser-diode-pumped solid-state laser. In the conventional laser-diode-pumped solid-state laser, the NYAB rod 13 has a crystal length L of 5 mm. The input side end face 13a of the NYAB rod 13 is provided with a reflective coating for a wavelength of 1,062 nm and an antireflection coating for a wavelength of 804 nm, and the output side end face 13b is provided with antireflection coatings for wavelengths of 1,062 nm and 531 nm. The input side end face 13a forms one of the resonator mirrors. An output mirror 30, which is the other resonator mirror, has a spherical inner surface 30a whose radius of curvature R is 100 mm. The inner surface 30a is provided with a reflective coating for a wavelength of 1,062 nm and an antireflection coating for a wavelength of 531 nm. An etalon 22 is inserted between the resonator mirrors.

In the conventional laser-diode-pumped solid-state laser, the resonator is very long and the laser beam 15 oscillates in several tens of longitudinal modes. The etalon 22 converts laser beam 15 into a single longitudinal mode. Further due to such a large length of the resonator, longitudinal mode hop is readily caused as the ambient temperature changes, which makes further unstable the power of the second harmonic 15'. In this conventional laser-diode-pumped solid-state laser, the output power of the second harmonic 15' was 6 mW when 400 mW broad area pumping laser beam 10 was input. This wavelength conversion efficiency is lower than that in said modification of the third embodiment, which proves that the wavelength conversion efficiency is improved in accordance with the present invention. It can be considered that the wavelength conversion efficiency is low in the conventional laser-diode-pumped solid-state laser because the number of the elements is larger and the loss in the oscillating laser beam due to scatter, absorption and reflection increases.

Figure 9:
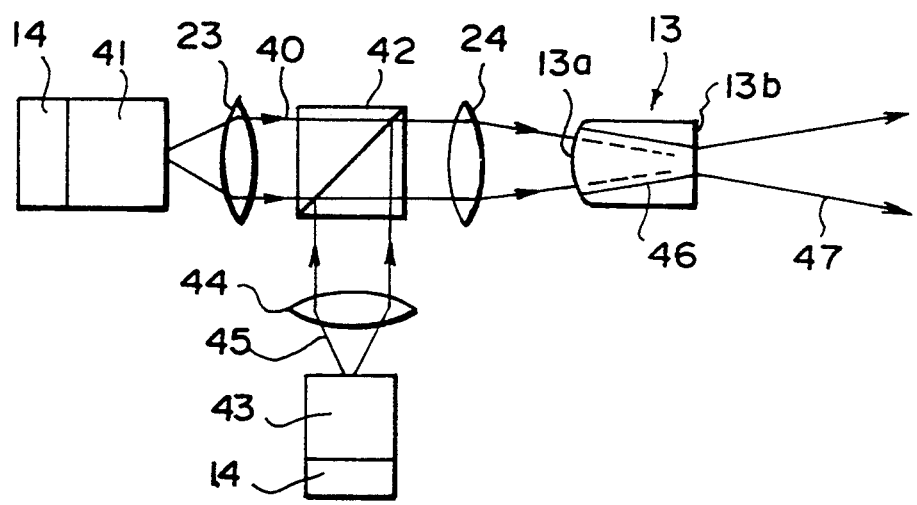
FIGS. 9 to 16 are schematic side views respectively showing laser-diode-pumped solid-state lasers in accordance with fourth to eleventh embodiments of the present invention.

FIG. 9 shows a laser-diode-pumped solid-state laser in accordance with a fourth embodiment of the present invention where a sum frequency wave is extracted therefrom. In this embodiment, a pumping laser beam 40 is emitted from a phased-array LD 41, and the wavelength of the pumping laser beam 40 is 804 nm. A beam splitter 42 is disposed between a collimator lens 23 and a condenser lens 24, and a second laser beam 45 of 830 nm which is emitted by another LD 43, which is a single-longitudinal-mode laser, and collimated into a beam of parallel rays by a collimator lens 44 impinges upon the beam splitter 42. The second laser beam 45 is combined with the pumping laser beam 40 and input into the NYAB rod 13 by the beam splitter 42. The temperature of each of the LDs 41 and 43 is controlled by a Peltier device 14 and a temperature control circuit (not shown).

The laser beam 45 of a wavelength $\lambda_1$ of 830 nm and a laser beam 46 of a wavelength $\lambda_2$ of 1,062 nm oscillated by the NYAB rod 13 are converted into a sum frequency wave having a wavelength $\lambda_3$ of 466 nm by the NYAB rod 13 itself. The NYAB rod 13 is cut so that angular phase matching of type I is achieved.

The end faces 13a and 13b of the NYAB rod 13 are provided with reflective coatings for a wavelength of 1,062 nm so that the oscillated laser beam 46 of 1,062 nm is confined between the end faces 13a and 13b and produces laser oscillation. Further, the input side end face 13a is provided with an antireflection coating for wavelengths of 804 nm and 830 nm, and the output side end face 13b is provided with an antireflection coating for a wavelength 466 nm.

When the output powers of the laser beams 40 and 45 were respectively set at 1 W and 100 mW in the laser-diode-pumped solid-state laser of this embodiment, a sum frequency wave of 1 mW was obtained.

Figure 10:
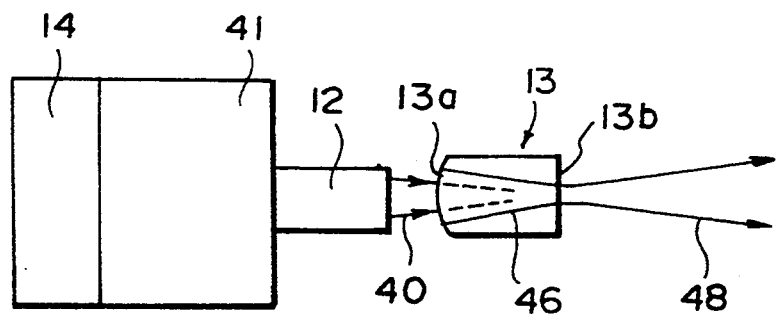

In a fifth embodiment of the present invention shown in FIG. 10, the NYAB rod 13 is pumped by a laser beam 40 of a wavelength $\lambda_1$ of 804 nm, and a sum frequency wave 48 (having a wavelength $\lambda_3$ of 459 nm) of the pumping laser beam 40 and the laser beam 46 oscillated by the NYAB rod 13 is obtained.

As can be understood from the description above, in the laser-diode-pumped solid-state lasers in accordance with the first to fifth embodiments of the present invention, a solid-state laser rod having a wavelength converting function is arranged to function as a resonator, or an assembly of such a solid-state laser rod (or solid-state laser rods) and an optical element (or optical elements) is arranged to function as a resonator, and accordingly, the internal loss is reduced and the internal power is increased, whereby the wavelength conversion efficiency is improved and an extremely intense laser beam having a short wavelength can be obtained at a high efficiency.

Figure 11:
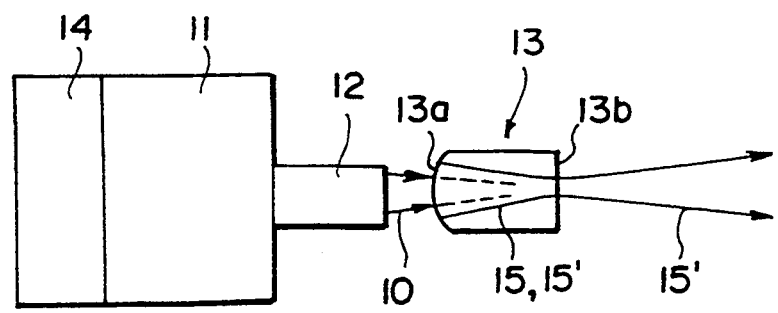

FIG. 11 shows a laser-diode-pumped solid-state laser in accordance with a sixth embodiment of the present invention. The sixth embodiment is substantially the same as the first embodiment except that the coatings on the end faces of the NYAB rod 13 differ from those in the first embodiment. That is, the laser-diode-pumped solid-state laser of this embodiment comprises a single-longitudinal-mode, single-transverse-mode LD 11 which emits a laser beam 10 as a pumping light, a Selfoc rod lens 12 which collimates the laser beam 10, which is divergent, into a beam of parallel rays and condenses the same, and an NYAB rod 13 which is a Self-Frequency-Doubling Crystal. These elements are mounted as a unitary assembly in a common casing (not shown). The LD 11 is kept at a predetermined temperature by a Peltier device 14 and a temperature control circuit (not shown).

The laser beam 10 emitted by the LD 11 has a wavelength $\lambda_1$ of 804 nm. The NYAB rod 13 emits a laser beam 15 whose wavelength $\lambda_2$ is 1,062 nm when Nd atoms with which the NYAB rod 13 is doped are excited by the laser beam 10.

The NYAB rod 13 has a crystal length L of 1 to 5 mm (2 mm in this particular embodiment) and a resonator is formed solely of the NYAB rod 13. That is, an end face 13a of the rod 13 facing toward the LD 11 is shaped into a spherical surface having a radius of curvature R of 2 mm and is coated with a layer which reflects the laser beam 15 (having a wavelength of 1,062 nm) and a second harmonic 15' having a wavelength of 531 nm with a reflectivity of not lower than 99.9% but readily transmits the pumping laser beam 10 (having a wavelength of 804 nm) with a transmissivity of not lower than 99.9%. The end face 13a forms an input side resonator mirror. The other end face 13b of the rod 13 is polished into a mirror surface and is coated with a layer which reflects a laser beam having a wavelength of 1,062 nm with a reflectivity of not lower than 99.9% but partly transmits the second harmonic 15' (e.g., with a transmissivity of 1%). The other end face 13b forms an output side resonator mirror. Accordingly the laser beam 15 is confined between the end faces 13a and 13b and produces laser oscillation.

The laser beam 15 is converted into the second harmonic 15' having a wavelength of 531 nm ($\frac{1}{2}$ of the wavelength of the laser beam 15) in the NYAB rod 13 which doubles the oscillator and the wavelength converter. The NYAB rod 13 is formed by cutting the crystal so that angular phase matching of type I is achieved between the wavelengths of 1,062 nm and 531 nm. By virtue of the coatings on the input side end face 13a and the output side end face 13b described above, the second harmonic 15' resonates in the resonator, and an extremely intense second harmonic 15' is extracted through the output side end face 13b.

When the output power of the pumping laser beam was set at 100 mW in the laser-diode-pumped solid-state laser of this embodiment, the output power of the second harmonic 15' was about 1.0 mW. Thus in this embodiment, though the crystal length L is very short (2 mm), the internal loss is reduced to not larger than 1% and the wavelength conversion efficiency can be increased.

Further since the resonator is short (2 mm in crystal length), the laser beam is readily oscillated in single-longitudinal-mode and accordingly a wavelength-converted wave which is is stable in power can be obtained.

Figure 12:
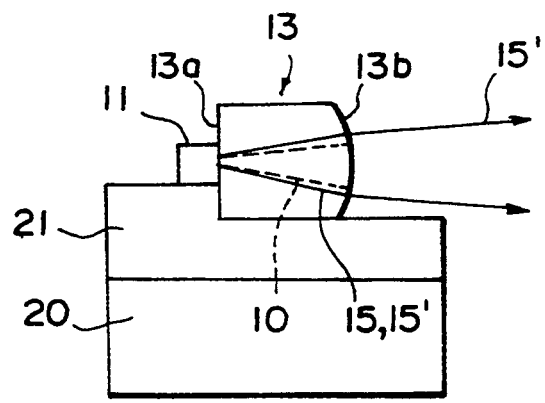

FIG. 12 shows a laser-diode-pumped solid-state laser in accordance with a seventh embodiment of the present invention. In this embodiment, an NYAB rod 13 which is similar to that shown in FIG. 11 in shape and opposite end faces 13a and 13b of which are coated with the same layers as the respective layers on the end faces 13a and 13b of the rod 13 shown in FIG. 11 is bonded on a copper block 21. An LD 11 is mounted on the copper block 21 in close contact with the NYAB rod 13. The copper block 21 is mounted on a Peltier device 20. With this arrangement, all the laser parts can be housed in an LD package. Further since the NYAB rod 13 is cooled by the Peltier device 20 for temperature control of the LD 11, the number of the parts can be reduced and at the same time, since longitudinal mode hop of the NYAB rod 13 can be suppressed by temperature control by the Peltier device 20, fluctuation in the output power of the second harmonic 15' with change in the ambient temperature can be suppressed substantially completely.

Also in this embodiment, by virtue of the coatings on the input side end face 13a and the output side end face 13b described above, the second harmonic 15' resonates in the resonator, and an extremely intense second harmonic 15' is extracted through the output side end face 13b.

Figure 13:
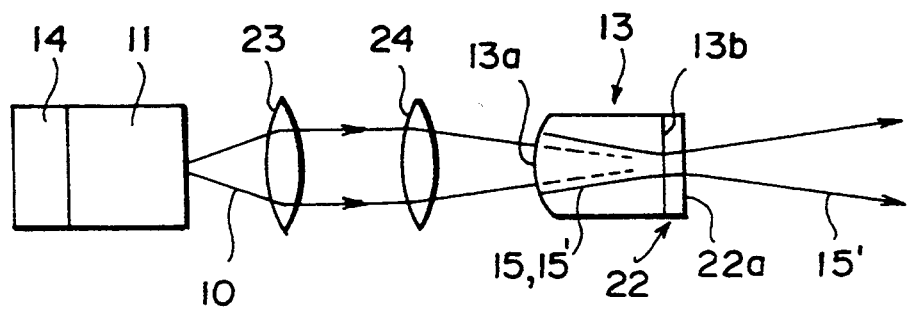

FIG. 13 shows a laser-diode-pumped solid-state laser in accordance with an eighth embodiment of the present invention. In this embodiment, an NYAB rod 13 which has a crystal length L of 7 mm longer than those in the sixth and seventh embodiments and has an input side end face 13a whose radius of curvature R is 7 mm is used in order to obtain a higher output power of the second harmonic 15'. Since the length of the resonator is substantially enlarged, the laser beam 15 emitted by the NYAB rod 13 oscillates in a multiple-longitudinal mode. In order to suppress oscillation of the laser beam 15 in a multiple-longitudinal mode, an etalon 22 is bonded on the output side end face 13b of the rod 13, and the output side end face 22a of the etalon 22 is coated with a layer similar to that coated on the output side end face 13b in the sixth embodiment.

An LD 11 which is the same as that used in the sixth embodiment is used as the pumping light source, and the laser beam 10 emitted by the LD 11 is input into the NYAB rod 13 through a collimator lens 23 which collimates the laser beam 10, which is divergent, into a beam of parallel rays and a condenser lens 24 which focuses collimated laser beam 10.

The oscillated laser beam 15 resonates between the input side end face 13a of the NYAB rod 13 and the Output side end face 22a of the etalon 22 and produces laser oscillation. The output power of the second harmonic 15' extracted from the laser-diode-pumped solid-state laser of this embodiment was about 50 mW when the output power of the pumping laser beam 10 was set at 100 mW.

Also in this embodiment, by virtue of the coatings on the input side end face 13a and the output side end face 22a of the etalon 22 described above, the second harmonic 15' resonates in the resonator, and an extremely intense second harmonic 15' is extracted through the output side end face 22a of the etalon 22.

In the case of a modification of the eighth embodiment where the crystal length L of the NYAB rod 13 was 5 mm and the radius of curvature of the input side end face 13a was 5 mm, the output power of the second harmonic 15' was 20 mW when 400 mW broad area pumping laser beam 10 was input. This wavelength conversion efficiency is higher than that in the conventional laser-diode-pumped solid-state laser shown in FIG. 8, which also proves that the wavelength conversion efficiency is improved in accordance with the present invention.

Also in the sixth to eighth embodiments, the power of the wavelength-converted wave can be stabilized also by bonding a wave plate 25 (e.g., a quarter-wave plate) on the output side end face 13b of the NYAB rod 13 instead of the etalon 22 as shown in FIG. 4, or by bonding an etalon 22 on the output side end face 13b and bonding a wave plate 25 on the etalon 22 as shown in FIG. 5. Further, the power of the wavelength-converted wave can be stabilized by sandwiching an etalon 22 between a pair of NYAB rods 13 and integrating them as shown in FIG. 6, or by sandwiching an etalon 22 between a pair of NYAB rods 13, bonding a pair of wave plates 25 on the outer end faces of the respective NYAB rods 13 and integrating them as shown in FIG. 7. In these cases, the resonator can be formed by coating opposite ends of the assembly of the NYAB rod(s) and the optical element(s) with the same layers as those used in the sixth embodiment. Even if the resonator is formed in such a way, a second harmonic 15' which is extremely intensified by resonance can be extracted.

Figure 14:
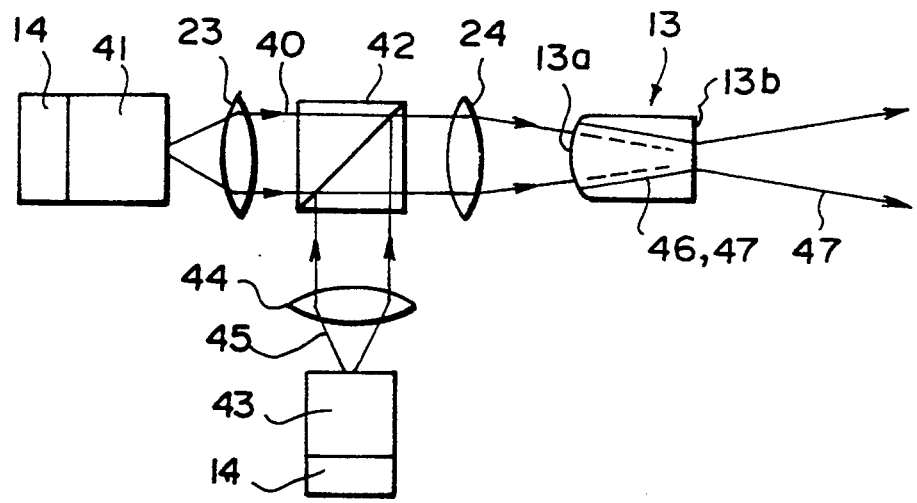

FIG. 14 shows a laser-diode-pumped solid-state laser in accordance with a ninth embodiment of the present invention where a sum frequency wave is extracted therefrom. In this embodiment, a pumping laser beam 40 is emitted from a phased-array LD 41, and the wavelength of the pumping laser beam 40 is 804 nm. A beam splitter 42 is disposed between a collimator lens 23 and a condenser lens 24, and a second laser beam 45 of 830 nm which is emitted by another LD 43, which is a single-longitudinal-mode laser, and collimated into a beam of parallel rays by a collimator lens 44 impinges upon the beam splitter 42. The second laser beam 45 is combined with the pumping laser beam 40 and input into the NYAB rod 13 by the beam splitter 42. The temperature of each of the LDs 41 and 43 is controlled by a Peltier device 14 and a temperature control circuit (not shown).

The laser beam 45 of a wavelength $\lambda 1$ of 830 nm and a laser beam 46 of a wavelength $\lambda 2$ of 1,062 nm oscillated by the NYAB rod 13 are converted into a sum frequency wave having a wavelength $\lambda 3$ of 466 nm by the NYAB rod 13 itself. The NYAB rod 13 is cut so that angular phase matching of type I is achieved.

The input side end faces 13a of the NYAB rod 13 is provided with a coating which reflects (high reflection) a wavelength of 1,062 nm and a sum frequency wave of 466 nm and does not reflect (antireflection) wavelengths of 804 nm and 830 nm. The output side end face 13b is provided with a coating which reflects (high reflection) wavelengths of 1,062 nm, 804 nm and 830 nm and partly reflects a wavelength of 466 nm. With this arrangement the oscillated laser beam 46 of 1,062 nm is confined between the end faces 13a and 13b to produce laser oscillation and resonates, whereby an extremely intense sum frequency wave 47 having a wavelength $\lambda 3$ of 466 nm is extracted through the output side end face 13b.

When the output powers of the laser beams 40 and 45 were respectively set at 1 W and 100 mW in the laser-diode-pumped solid-state laser of this embodiment, a sum frequency wave 47 of 10 mW was obtained.

Figure 15:
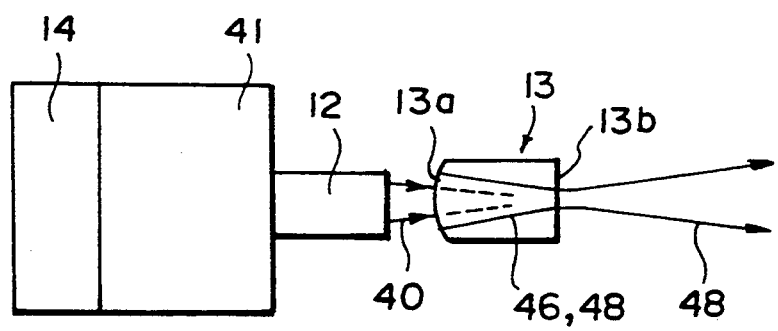

In a tenth embodiment of the present invention shown in FIG. 15, the NYAB rod 13 is pumped by a laser beam 40 of a wavelength $\lambda 1$ of 804 nm, and a sum frequency wave 48 (having a wavelength $\lambda 3$ of 459 nm) of the pumping laser beam 40 and the laser beam 46 oscillated by the NYAB rod 13 is obtained.

Also in this embodiment, the input side end faces 13a of the NYAB rod 13 is provided with a coating which reflects (high reflection) a wavelength of 1,062 nm and a sum frequency wave of 459 nm and does not reflect (antireflection) a wavelength of 804 nm. The output side end face 13b is provided with a coating which reflects (high reflection) wavelengths of 1,062 nm and 804 nm and partly reflects a wavelength of 459 nm. With this arrangement the oscillated laser beam 46 of 1,062 nm is confined between the end faces 13a and 13b to produce laser oscillation and resonates, whereby an extremely intense sum frequency wave 48 having a wavelength $\lambda 3$ of 459 nm is extracted through the output side end face 13b.

A phased-lock array laser, a broad area laser and the like can be employed as the semiconductor lasers for outputting the pumping light or the fundamental wave in addition to those described above.

Further, the resonator need not be limited to the Fabry-Perot type used in the embodiments described above but, for instance, a ring resonator can be used.

As described above, longitudinal mode hop can be suppressed by controlling the temperature of the crystal of the laser medium, whereby the power of the wavelength-converted wave can be stabilized. In the case of the embodiments described above, the cavity length can be extremely small and accordingly, temperature control of the crystal is greatly facilitated and the power of the wavelength-converted wave can be kept stable irrespective of change of the ambient temperature.

Figure 16:
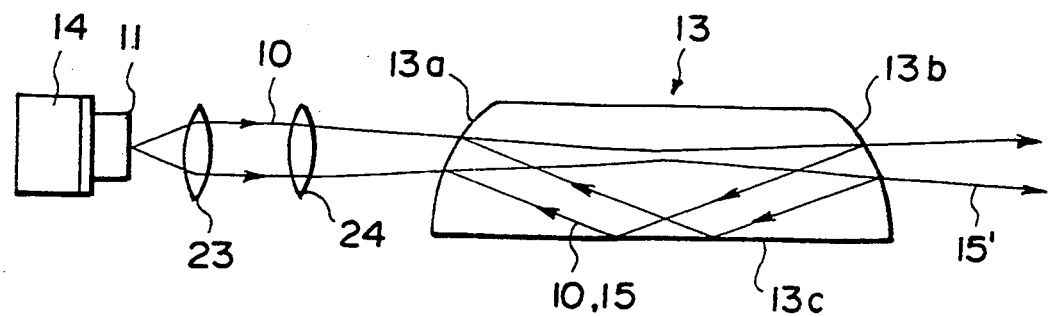

FIG. 16 shows a laser-diode-pumped solid-state laser in accordance with an eleventh embodiment of the present invention. The laser-diode-pumped solid-state laser comprises a single-longitudinal-mode, single-transverse-mode LD 11 which emits a laser beam 10 as a pumping light, a collimator lens 23 which collimates the laser beam 10, which is divergent, into a beam of parallel rays, a condenser lens 24 which focuses the collimated laser beam 10, and a NYAB rod 13 which is a Self-Frequency-Doubling Crystal. These elements are mounted as a unitary assembly in a common casing (not shown). Otherwise they may be formed monolithically. The LD 11 is kept at a predetermined temperature by a Peltier device 14 and a temperature control circuit (not shown).

The laser beam 10 emitted by the LD 11 has a wavelength $\lambda 1$ of 804 nm, The NYAB rod 13 emits a laser beam 15 whose wavelength $\lambda 2$ is 1,062 nm when Nd atoms with which the NYAB rod 13 is doped are excited by the laser beam 10.

A resonator is formed solely of the NYAB rod 13. That is, an end face 13a of the rod 13 facing toward the LD 11 is shaped into a spherical surface having a center of curvature at a position deviated from the optical axes of the lenses 23 and 24 and is coated with a layer which reflects the laser beam 15 (having a wavelength of 1,062 nm) with a reflectivity of not lower than 99.9% but readily transmits the pumping laser beam 10 (having a wavelength of 804 nm) with a transmissivity of not lower than 99.9%, The end face 13a forms an input side resonator mirror, The other end face 13b of the rod 13 is also shaped into a spherical surface having a center of curvature at a position deviated from the optical axes of the lenses 23 and 24 and is coated with a layer which reflects the laser beams 10 and 15 with a reflectivity of not lower than 99.9% but readily transmits a second harmonic 15' having a wavelength of 531 nm. The other end face 13b forms an output side resonator mirror.

Figure 17:
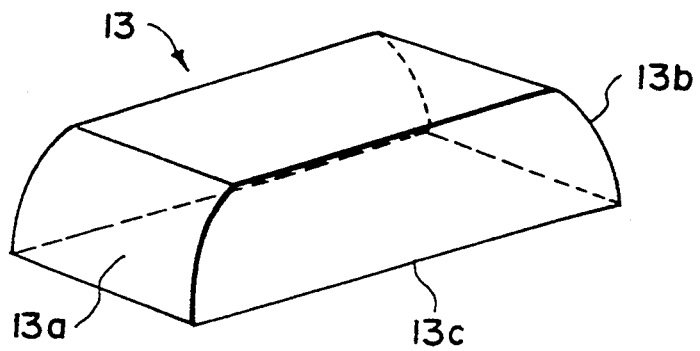
FIG. 17 is a perspective view showing the solid-state laser rod employed in the eleventh embodiment.

The lower face 13c of the NYAB rod 13 is polished flat and is coated with a layer which reflects the laser beams 10 and 15. FIG. 17 shows the shape of the NYAB rod 13.

In the NYAB rod 13, the laser beam 15 is successively reflected by the faces 13a, 13b and 13c, and is confined in a ring-like path, and produces laser oscillation.

The laser beam 15 is converted into the second harmonic 15' having a wavelength of 531 nm ($\frac{1}{2}$ of the wavelength of the laser beam 15) in the NYAB rod 13 which doubles the oscillator and the wavelength converter. The NYAB rod 13 is formed by cutting the crystal so that angular phase matching of type I is achieved between the wavelengths of 1,062 nm and 531 nm. Since the output side resonator mirror 13b is coated with the layer which readily transmits a laser beam having a wavelength of 531 nm as described above, the second harmonic 15' can be extracted from the resonator at a high efficiency.

When the output power of the pumping laser beam 10 was set at 100 mW in the laser-diode-pumped solid-state laser of this embodiment, the output power of the second harmonic 15' was about 1.0 mW. Thus in this embodiment, though the crystal length L is very short (7 mm), the internal loss is reduced to not larger than 1% and the wavelength conversion efficiency can be increased.

Further since the resonator is in the form of a ring resonator and generation of a standing wave is suppressed, the laser beam is readily oscillated in single-longitudinal-mode and accordingly a second harmonic 15' which is is stable in power can be obtained.

Though the laser beam 15 can travel either clockwisely or counterclockwisely in the ring resonator, it is possible to cause the laser beam 15 to travel only in one direction (in the clockwise direction as seen in FIG. 16 in this particular embodiment) by applying a magnetic field to the laser beam 15 and thereby controlling the plane of polarization. When the laser beam 15 travels only in one direction, the laser beam 15 cannot enter the LD 11.

In this embodiment, the distances between the faces 13a, 13b and 13c change with change in the temperature of the NYAB rod 13 but the change in the oscillating wavelength due to the change in the distances between the faces 13a, 13b and 13c is slight and laser oscillation itself is not disabled.

Figure 18:
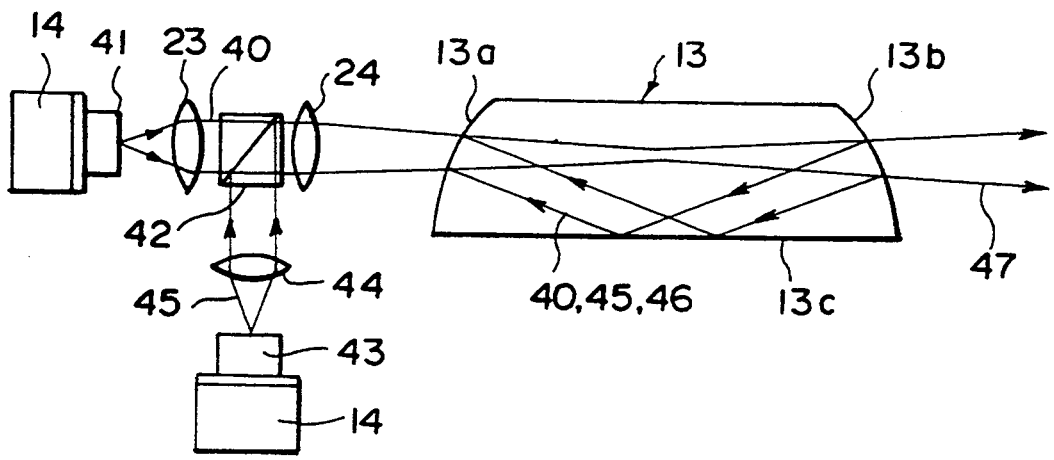
FIG. 18 is a schematic side view showing a laser-diode-pumped solid-state laser in accordance with twelfth embodiment of the present invention.

FIG. 18 shows a laser-diode-pumped solid-state laser in accordance with a twelfth embodiment of the present invention where a sum frequency wave is extracted therefrom. In this embodiment, a pumping laser beam 40 is emitted from a phased-array LD 41, and the wavelength of the pumping laser beam 40 is 804 nm. A beam splitter 42 is disposed between a collimator lens 23 and a condenser lens 24, and a second laser beam 45 of 830 nm which is emitted by another LD 43, which is a single-longitudinal-mode laser, and collimated into a beam of parallel rays by a collimator lens 44 impinges upon the beam splitter 42. The second laser beam 45 is combined with the pumping laser beam 40 and input into the NYAB rod 13 by the beam splitter 42. The temperature of each of the LDs 41 and 43 is controlled by a Peltier device 14 and a temperature control circuit (not shown).

The laser beam 45 of a wavelength $\lambda 1$ of 830 nm and a laser beam 46 of a wavelength $\lambda 2$ of 1,062 nm oscillated by the NYAB rod 13 are converted into a sum frequency wave having a wavelength $\lambda 3$ of 466 nm by the NYAB rod 13 itself. The NYAB rod 13 is cut so that angular phase matching of type I is achieved.

The input side end faces 13a of the NYAB rod 13 is provided with a coating which reflects (high reflection) a wavelength of 1,062 nm and does not reflect (antireflection) wavelengths of 804 nm and 830 nm. The output side end face 13b is provided with a coating which reflects (high reflection) wavelengths of 1,062 nm, 804 nm and 830 nm and does not reflect (antireflection) a wavelength of 466 nm. The lower face 13c of the NYAB rod 13 is coated with a layer which reflects (high reflection) wavelengths of 1,062 nm, 804 nm and 830 nm. With this arrangement the oscillated laser beam 46 of 1,062 nm is confined and produces laser oscillation, whereby a sum frequency wave 47 having a wavelength $\lambda 3$ of 466 nm is extracted through the output side end face 13b.

When the output powers of the laser beams 40 and 45 were respectively set at 1 W and 100 mW in the laser diode-pumped solid-state laser of this embodiment, a sum frequency wave of 1 mW was obtained.

In the eleventh and twelfth embodiments, the resonator is in the form of a ring resonator, and accordingly the laser beam is oscillated in single-longitudinal-mode, whereby confliction between the longitudinal modes of the laser beam can be avoided and the power of the wavelength-converted wave can be stabilized.

As can be understood from the description above, in the laser-diode-pumped solid-state lasers in accordance with the eleventh and the twelfth embodiments of the present invention, a solid-state laser rod having a wavelength converting function is arranged to function as a resonator, the internal loss is reduced and the internal power is increased, whereby the wavelength conversion efficiency is improved and an extremely intense laser beam having a short wavelength can be obtained at a high efficiency. Particularly, the sum frequency wave which conventionally can be obtained only at a low efficiency can be obtained at a high efficiency.

Though, in the embodiments described above, NYAB crystal is used as the Self-Frequency-Doubling Crystal, Nd:MgO:LiNbO$_3$, Nd:KTP, Nd:PNP and the like also can be employed in the present invention. Some of these materials have a nonlinear optical constant larger than that of the NYAB crystal and when such materials are used, the wavelength conversion efficiency is further improved.

Though, in the embodiments described above, description has been made only on the basis of 1 $\mu$m band of the oscillating line of Nd, oscillations in 0.9 $\mu$m band and 1.3 $\mu$m band of the oscillating line of Nd are both feasible since the internal loss can be greatly reduced in the laser-diode-pumped solid-state laser of this embodiment, and a wavelength-converted wave such as the second harmonic of the laser beam oscillated in 0.9 $\mu$m band or in 1.3 $\mu$m band, the sum frequency wave of the laser beam oscillated in 0.9 $\mu$m band or in 1.3 $\mu$m band and a semiconductor laser beam or the like can be obtained at a high efficiency.

As can be understood from the description above, in the laser-diode-pumped solid-state laser in accordance with the present invention, since the wavelength conversion efficiency is high, a sufficiently intense laser beam of a short wavelength can be obtained even if a single-longitudinal mode single transverse mode semiconductor laser which has a relatively low output power is employed as the pumping source. When such a single-longitudinal mode single transverse mode semiconductor laser is used as the pumping source, the oscillation efficiency of the solid-state laser rod is increased and the energy utilization efficiency is improved.

Since a sufficiently intense laser beam of a short wavelength can be obtained even if a semiconductor laser of a relatively low output power is used as the pumping source, the laser-diode-pumped solid-state laser of the present invention can use a less costly semiconductor laser of lower output power and can be manufactured at a lower cost than the conventional laser-diode-pumped solid-state laser for a given intensity of the wavelength-converted wave. Further since the solid-state laser rod doubles as the resonator and the number of the parts is reduced, the laser-diode-pumped solid-state laser of the present invention can be manufactured at a further low cost and at the same time can be compact in size.

We claim:

1. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that a wave plate integrally provided on one end face of the solid-state laser rod to stabilize the power of a wavelength-converted wave, the other end face of the solid-state laser rod is formed into a resonator mirror and one end face of the wave plate is formed into the other resonator mirror, said other end face of the solid-state laser rod and said one end face of the wave plate forming a resonator and said wavelength-converted wave is extracted from the resonator which is a sum frequency wave of a laser beam oscillated by the solid-state laser rod and a semiconductor laser beam emitted by a designated semiconductor laser, said designated semiconductor laser being one of said semiconductor laser which pumps the solid-state laser rod and a second semiconductor laser which is separate from the semiconductor laser which pumps the solid-state laser rod.

2. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that an optical element, including one of an etalon and a wave plate, is integrally sandwiched between one end faces of a pair of solid-state laser rods to stabilize the power of a wavelength-converted wave, the other end faces of the solid-state laser rods are formed into resonator mirrors to form a resonator, and p1 said wavelength-converted wave is extracted from the resonator which is a sum frequency wave of a laser beam oscillated by the solid-state laser rod and a semiconductor laser beam emitted by a designated semiconductor laser, said designated semiconductor laser being one of said semiconductor laser which pumps the solid-state laser rod and a second semiconductor laser which is separate from the semiconductor laser which pumps the solid-state laser rod.

3. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that a plurality of optical elements, including one of an etalon and a wave plate, are bonded on one or more solid-state laser rod(s) to stabilize the power of a wavelength-converted wave, at least one end face of the optical elements is formed into a resonator mirror to form a resonator, and said wavelength-converted wave is extracted from the resonator, which is a sum frequency wave of a laser beam oscillated by the solid-state laser rod and a semiconductor laser beam emitted by a designated semiconductor laser, said designated semiconductor laser being one of said semiconductor laser which pumps the solid-state laser rod and a second semiconductor laser which is separate from the semiconductor laser which pumps the solid-state laser rod.

4. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that opposite end faces of the solid-state laser rod are formed into resonator mirrors to form a resonator for
(i) a laser beam oscillated by the solid-state laser rod and
(ii) a wavelength-converted wave, said wavelength-converted wave being one of (a) a second harmonic wave of a laser beam oscillated by the solid-state laser rod and (b) a sum frequency wave of a laser beam oscillated by the solid-state laser rod and a semiconductor laser beam emitted by a designated semiconductor laser, said opposite end faces of the solid-state laser rod forming a resonator, and a resonating wavelength-converted wave is extracted from the resonator, and wherein said designated semiconductor laser being one of said semiconductor laser which pumps the solid-state laser rod and a second semiconductor laser which is separate from the semiconductor laser which pumps the solid-state laser rod.

5. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that an optical element, including one of an etalon and a wave plate, is integrally provided on one end face of the solid-state laser rod to stabilize the power of a wavelength-converted wave, the other end face of the solid-state laser rod and one end face of the optical element are formed into resonator mirrors to from a resonator for
(i) a laser beam oscillated by the solid-state laser rod and
(ii) said wavelength-converted wave, said wavelength-converted wave being one of (a) a second harmonic wave of a laser beam oscillated by the solid-state laser rod and (b) a sum frequency wave of a laser beam oscillated by the solid-state laser rod and a semiconductor laser beam emitted by a designated semiconductor laser, said other end face of the solid-state laser rod and said one end face of the optical element forming a resonator, and a resonating wavelength-converted wave is extracted from the resonator, and wherein said designated semiconductor laser being one of said semiconductor laser which pumps the solid-state laser rod and a second semiconductor laser which is separate from the semiconductor laser which pumps the solid-state laser rod.

6. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that an optical element, including one of an etalon and a wave plate, is integrally sandwiched between one end faces of a pair of solid-state laser rods to stabilize the power of a wavelength-converted wave, the other end faces of the solid-state laser rods are formed into resonator mirrors to form a resonator for
- (i) a laser beam oscillated by the solid-state laser rod and
- (ii) said wavelength-converted wave, said wavelength-converted wave being one of (a) a second harmonic wave of a laser beam oscillated by the solid-state laser rod and (b) a sum frequency wave of a laser beam oscillated by the solid-state laser rod and a semiconductor laser beam emitted by a designated semiconductor laser, said other end faces of the solid-state laser rods forming a resonator, and a resonating wavelength-converted wave is extracted from the resonator, and wherein said designated semiconductor laser being one of said semiconductor laser which pumps the solid-state laser rod and a second semiconductor laser which pumps the solid-state laser rod and a second semiconductor laser which is separate from the semiconductor laser which pumps the solid-state laser rod.

7. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that a plurality of optical elements, including one of an etalon and a wave plate, are bonded on one or more solid-state laser rod(s) to stabilize the power of a wavelength-converted wave, at least one end face of the optical elements is formed into a resonator mirror to form a resonator for
- (i) a laser beam oscillated by the solid-state laser rod and
- (ii) said wavelength-converted wave, said wavelength-converted wave being one of (a) a second harmonic wave of a laser beam oscillated by the solid-state laser rod and (b) a sum frequency wave of a laser beam oscillated by the solid-state laser rod and a semiconductor laser beam emitted by a designated semiconductor laser, and a resonating wavelength-converted wave is extracted from the resonator, and wherein said designated semiconductor laser being one of said semiconductor laser which pumps the solid-state laser rod and a second semiconductor laser which is separate from the semiconductor laser which pumps the solid-state laser rod.

8. A laser-diode-pumped solid-state laser comprising a solid-state laser rod which is doped with a rare-earth material such as neodymium and has a wavelength converting function and a semiconductor laser which pumps the solid-state laser rod wherein the improvement comprises that said solid-state laser rod is provided with a ring resonator structure, and a wavelength-converted wave is extracted from the ring resonator structure which is one of (a) a second harmonic wave of the laser beam oscillated by the solid-state laser rod and (b) a sum frequency wave of a laser beam oscillated by the solid-state laser rod and a semiconductor laser beam emitted by a designated semiconductor laser, said designated semiconductor laser being one of said semiconductor laser which pumps the solid-state laser rod and a second semiconductor laser which is separate from the semiconductor laser which pumps the solid-state laser rod.

* * * * *